W. H. PAIGE.
CAR-WHEEL.
No. 169,370. Patented Nov. 2, 1875.
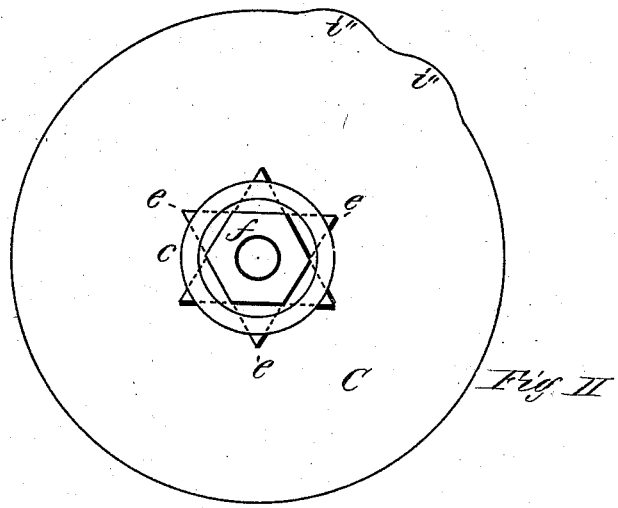
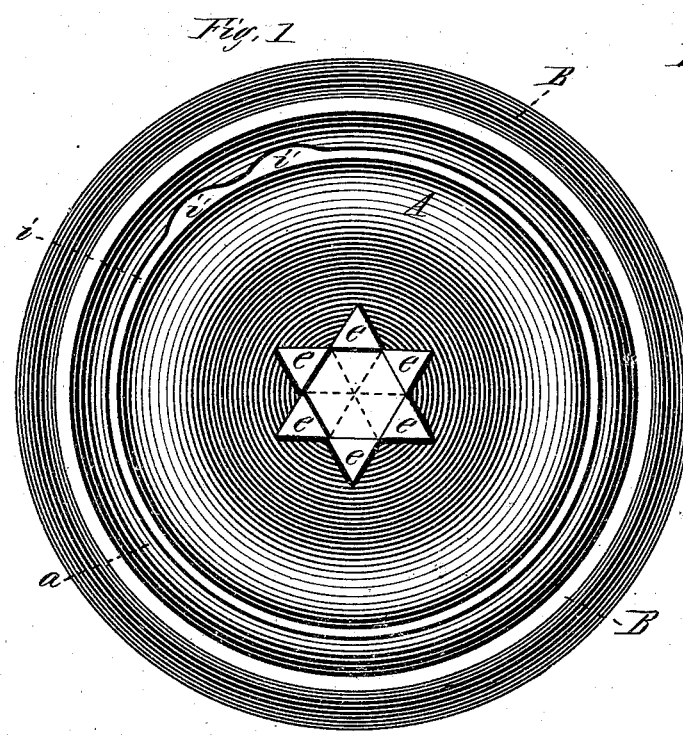
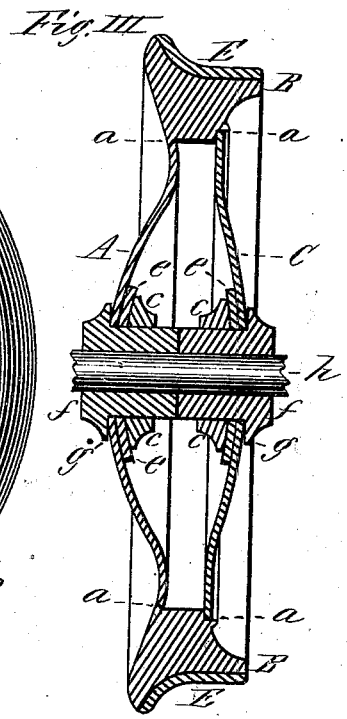
Witnesses,
C. E. Buckland,
M. B. Hall
Inventor,
William H. Paige,
By T. A. Curtis
his Atty.

UNITED STATES PATENT OFFICE.

WILLIAM H. PAIGE, OF SPRINGFIELD, MASSACHUSETTS.

IMPROVEMENT IN CAR-WHEELS.

Specification forming part of Letters Patent No. 169,370, dated November 2, 1875; application filed April 16, 1875.

*To all whom it may concern:*

Be it known that I, WILLIAM H. PAIGE, of Springfield, in the State of Massachusetts, have invented a new and useful Improvement in Wrought-Iron Car-Wheels; and that the following is a full, clear, and exact description thereof, reference being had to the accompanying drawings, making a part of this specification and description.

The object of my invention is to form a railway-car wheel of wrought metal, or having the side plates and tire of wrought metal, and secured together by spinning or turning the parts one over the other, and dispensing with much of the heavy and expensive forging or casting; and to this end my invention consists of making the side plates of wrought metal, as also the tire, and of punching out and turning over pieces at the center of the plates, for the bearings at the hub, and also of making an annular channel in the tire, with an annular projection or ridge just outside, and fitting the perimeter of the plates therein, and turning the annular projection or ridge over upon the perimeter of each plate, whereby the plates are firmly secured in place, and the hub in each plate has a firm bearing.

Figure I is a plan view of the inside of one of the plates attached to the tire, and prepared to receive the hub. Fig. II is a plan view of the inside of the other plate separate from the tire, and Fig. III is a central vertical section of the wheel as finished.

In the drawings, A represents one of the side plates of a car-wheel, the center of which is punched through at the dotted lines radiating from the center, as shown in Fig. I, and the parts inclosed between these dotted lines are then turned back, when heated, firmly against the inner face of the plate, forming the triangular parts $e$. This renders that portion of the plate at the center, for one-third its area, of double thickness, and forms a polygonal hole in the center, as shown clearly in Fig. I. A hub, $f$, having a hole therein, in which to insert the axle $h$, and of a form to fit the central hole in the plate, and having an annular flange, $g$, is then inserted from the outside, and the plate and hub being heated to the desired degree, a washer, $c$, is placed over the inner end of the hub $f$, (the washer being also heated, if desirable,) and swaged down firmly against the parts $e$, as shown clearly in section in Fig. III. This swaging of the washer $c$ into its proper place may be done by hammering, while the hub, plate, and washer are heated; but I should prefer, as a cheaper and more expeditious process, to place the outer end of the hub in a die or bed of the proper form to receive it, with its inner end uppermost, the hub having been previously inserted into its place in the plate, and swage the washer $c$ down firmly against the parts $e$, and the washer and hub will then be held firmly in place, and the hub, if it should require it, may be given its proper interior form afterward, by boring or otherwise. Each side plate is treated in like manner, and, when secured in the plates, the hubs nearly or quite touch at their inner ends, when the plates are secured to the tire, as shown in Fig. III. An annular channel, $i$, is made in the tire—one on each side for each plate—with an annular projection, $a$, formed just outside of it, and the plates A and C are made of a diameter to just fit into their respective channels, and when the plate is inserted therein the projecting metal at $a$ is turned in over the edge of the plate all around. This may be done by a hammer, or the wheel may be placed upon a rotating disk or platform, and a rotating movement being given to the platform and wheel, the metal at the ridge $a$ may be pressed upon by a roller with sufficient power to force the metal of the ridge $a$ over and upon the edge of the plate firmly enough to hold the plate perfectly tight and secure. If the channel $i$ were made scalloped, as shown at $i'$, or even in a more serrated form, and the plate made of a corresponding form, the latter might be less liable to work loose; and to make the plate stronger at the periphery, it may be re-enforced with an additional strip welded on near the edge, or the edge turned over and back against the plate, if desirable. The tire may have a steel tread, secured either by welding or by any other desirable and convenient means, which will prevent the tire from wearing as fast as it might otherwise do.

Having thus described my invention, what I claim as new is—

1. An improved railway-car wheel, having the side plates A and C made of wrought metal, each fitted into an annular channel in the tire, which is also made of wrought metal, and secured therein by turning the metal of the tire over upon the edge of the plate, substantially as set forth.

2. In a railway-car wheel, the wrought-metal side plates, having the pieces $e$ formed up from the center of the plate, and turned back against it, to furnish a solid bearing for the hub $f$ and washer $c$, substantially as described.

WILLIAM H. PAIGE.

Witnesses:
C. E. BUCKLAND,
JNO. D. PATTEN.